(12) United States Patent
Godwin et al.

(10) Patent No.: US 10,757,237 B2
(45) Date of Patent: Aug. 25, 2020

(54) CONFIGURABLE COMMUNICATIONS APPARATUS AND KIT

(71) Applicant: RF Solutions, LLC, South Hackensack, NJ (US)

(72) Inventors: Chris Godwin, New Rochelle, NY (US); William Share, West New York, NY (US)

(73) Assignee: RF Solutions, LLC, South Hackensack, NJ (US)

( * ) Notice: Subject to any disclaimer, the term of this patent is extended or adjusted under 35 U.S.C. 154(b) by 0 days.

(21) Appl. No.: 16/244,886

(22) Filed: Jan. 10, 2019

(65) Prior Publication Data

US 2019/0222681 A1 Jul. 18, 2019

Related U.S. Application Data

(60) Provisional application No. 62/616,830, filed on Jan. 12, 2018, provisional application No. 62/616,934, filed on Jan. 12, 2018.

(51) Int. Cl.
| | |
|---|---|
| *H04M 1/06* | (2006.01) |
| *H04B 17/17* | (2015.01) |
| *H04L 1/00* | (2006.01) |
| *H04L 1/18* | (2006.01) |
| *H04M 1/725* | (2006.01) |

(52) U.S. Cl.
CPC .............. *H04M 1/06* (2013.01); *H04B 17/17* (2015.01); *H04L 1/0073* (2013.01); *H04L 1/189* (2013.01); *H04M 1/7253* (2013.01); *H04M 1/72538* (2013.01); *H04M 1/72513* (2013.01); *H04M 1/72536* (2013.01)

(58) Field of Classification Search
CPC ...... H04M 1/189; H04M 1/06; H04M 1/7253; H04M 1/72538; H04B 17/17; H04L 1/189; H04L 1/0073
USPC .......................... 379/447, 454, 426, 435, 446
See application file for complete search history.

(56) References Cited

U.S. PATENT DOCUMENTS

| | | | | |
|---|---|---|---|---|
| 4,355,212 | A * | 10/1982 | Kosten ................ | H04M 1/0297 379/435 |
| 4,577,068 | A * | 3/1986 | Kelly ...................... | H04M 1/02 379/428.02 |
| 5,784,456 | A * | 7/1998 | Carey ...................... | H04M 1/02 379/202.01 |
| 6,035,214 | A * | 3/2000 | Henderson ............ | G06F 1/1616 345/905 |
| 2004/0192292 | A1* | 9/2004 | Chang ................. | H04M 1/2473 455/426.1 |

* cited by examiner

*Primary Examiner* — Melur Ramakrishnaiah
(74) *Attorney, Agent, or Firm* — Intrinsic Law Corp.

(57) ABSTRACT

A configurable apparatus includes a housing, a cradle, and a handset. In a first configuration, a first bracket is releasably attached to the cradle and to the housing such that the cradle is disposed next to a first side of the housing. In a second configuration, a second bracket is releasably attached to the cradle and to the housing such that the cradle is disposed next to a second side of the housing. The first and second brackets can include L-shaped brackets, which can be mirror images of each other. The communication system may be used in multi-story buildings or similar structures to facilitate communications among multiple stations (e.g., emergency response stations) within the structures.

30 Claims, 7 Drawing Sheets

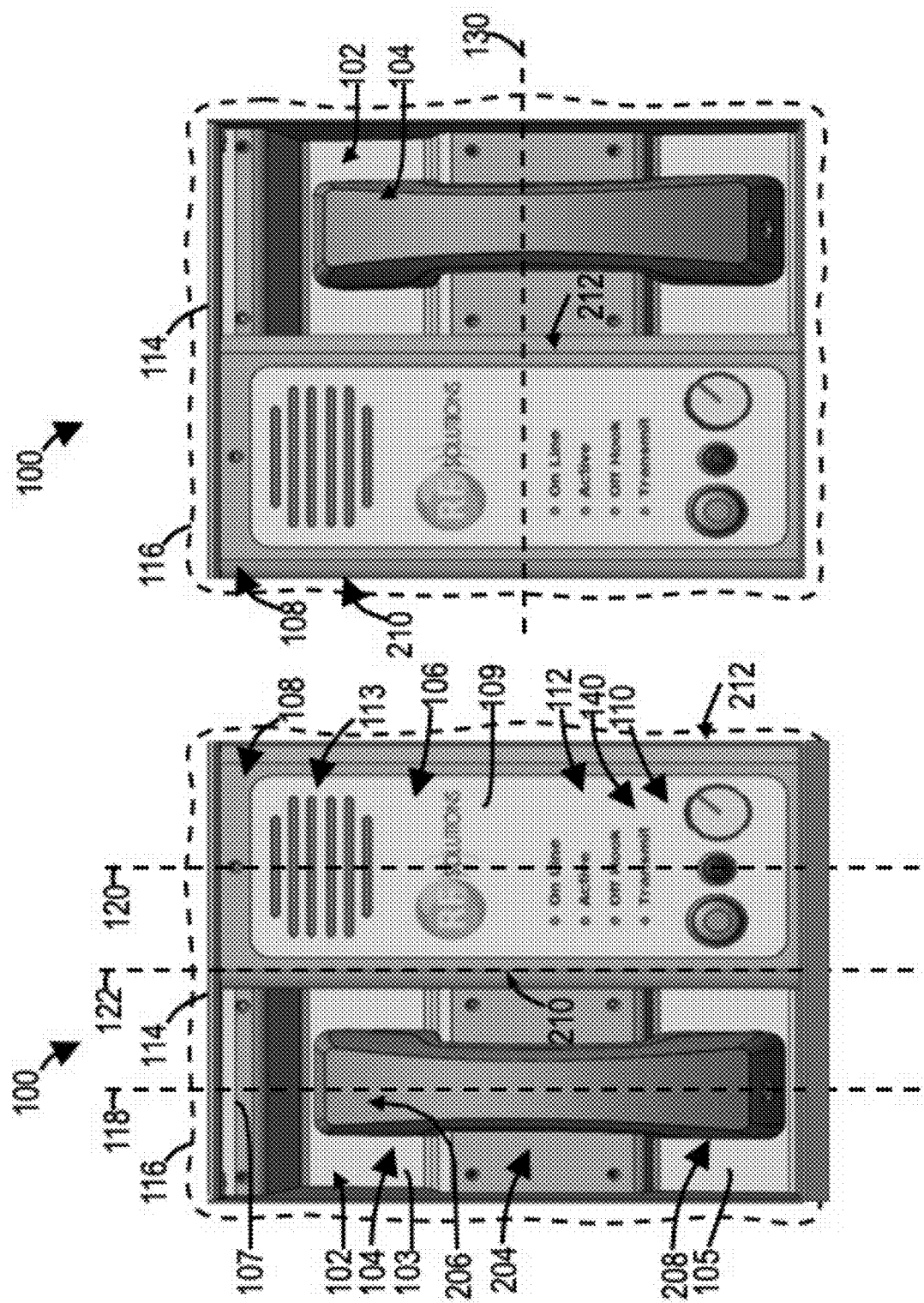

CONFIGURABLE COMMUNICATIONS APPARATUS AND KIT

CROSS-REFERENCE TO RELATED APPLICATIONS

This application claims priority to U.S. Provisional Application No. 62/616,830, titled "System and Method Having Communication Console and Handset," filed on Jan. 12, 2018, and to U.S. Provisional Application No. 62/616,934, titled "Auxiliary Radio Communication System," filed on Jan. 12, 2018, which are hereby incorporated by reference.

TECHNICAL FIELD

This application relates to communication consoles such as for multistory buildings.

BACKGROUND

Existing emergency communications systems for multistory buildings include a console and a cradle/handset that is fixedly attached to one side of the console. In one type of system, the cradle/handset is fixedly attached to the right side of the console. In another type of system, the cradle/handset is fixedly attached to the left side of the console. In order to provide both type of systems, manufacturers need to produce and stock both types of systems, which increases costs.

It would be desirable to overcome these and/or other deficiencies in the art.

SUMMARY

It would be advantageous to have the ability to integrate a cradle (for a handset) to each side of a housing for the console, and thereby facilitate the positioning of the handset on either side of the console, as may be desired.

It is an object of at least some embodiments to address one or more of the above technical challenges.

An aspect of the invention is directed to a configurable apparatus comprising: a housing having opposing first and second housing sides; a cradle; and a handset removably disposed on the cradle, wherein: the apparatus has a first configuration where a first bracket is releasably attached to the cradle and to the housing such that the cradle is disposed next to the first housing side, and the apparatus has a second configuration where a second bracket is releasably attached to the cradle and to the housing such that the cradle is disposed next to the second housing side.

In one or more embodiments, the first and second brackets are mirror images of each other. In one or more embodiments, the first and second brackets include first and second L-shaped brackets, respectively. In one or more embodiments, each L-shaped bracket includes orthogonal front and side bodies. In one or more embodiments, when the apparatus is in the first configuration the front body of the first L-shaped bracket is releasably attached to a back side of the cradle and the side body of the first L-shaped bracket is releasably attached to the first housing side, and when the apparatus is configured in the second configuration the front body of the second L-shaped bracket is releasably attached to the back side of the cradle and the side body of the second L-shaped bracket is releasably attached to the second housing side. In one or more embodiments, each of the first and second brackets includes a board bracket.

In one or more embodiments, the housing includes a front housing body and the first and second housing sides extend from the front housing body towards a back of the apparatus. In one or more embodiments, the apparatus further comprises a console assembly disposed in an opening defined in the front housing body. In one or more embodiments, the console assembly includes a control interface that selects a communication channel for the handset. In one or more embodiments, the console assembly includes a visual indicator of a status of the apparatus. In one or more embodiments, the console assembly further comprises a communications interface for bidirectional communication with a mobile computing device.

In one or more embodiments, the cradle includes at least one recess to removably receive a portion of the handset. In one or more embodiments, when the apparatus is in the first configuration the first bracket is releasably attachable to a control assembly, the first bracket disposed between the control assembly and the cradle, and when the apparatus is in the second configuration the second bracket is releasably attachable to the control assembly, the second bracket disposed between the control assembly and the cradle. In one or more embodiments, the control assembly includes a circuit board. In one or more embodiments, the housing and the cradle are disposed in a case, the case mountable on a wall.

Another aspect of the invention is directed to a kit comprising: a housing having first and second housing sides; a handset; a cradle having opposing front and back sides and a recess to removably receive the handset; a first bracket releasably attachable, in a first configuration, to the back side of the cradle and to the first housing side to dispose the cradle next to the first housing side; and a second bracket releasably attachable, in a second configuration, to the back side of the cradle and to the second housing side to dispose the cradle next to the second housing side.

In one or more embodiments, the first and second brackets are mirror images of each other. In one or more embodiments, the first and second brackets include first and second L-shaped brackets, respectively. In one or more embodiments, each L-shaped bracket includes orthogonal front and side bodies. In one or more embodiments, in the first configuration the front body of the first L-shaped bracket is releasably attachable to the back side of the cradle and the side body of the first L-shaped bracket is releasably attachable to the second housing side, and in the second configuration the front body of the second L-shaped bracket is releasably attachable to the back side of the cradle and the side body of the second L-shaped bracket is releasably attachable to the first housing side.

BRIEF DESCRIPTION OF THE DRAWINGS

Reference is made to the following detailed description in connection with the accompanying drawings, in which:

FIG. 1 is a front elevational view of a system in a first state, in accordance with at least some embodiments;

FIG. 2 is a front elevational view of the system of FIG. 1 in a second state, in accordance with at least some embodiments;

DETAILED DESCRIPTION

Figure 3:
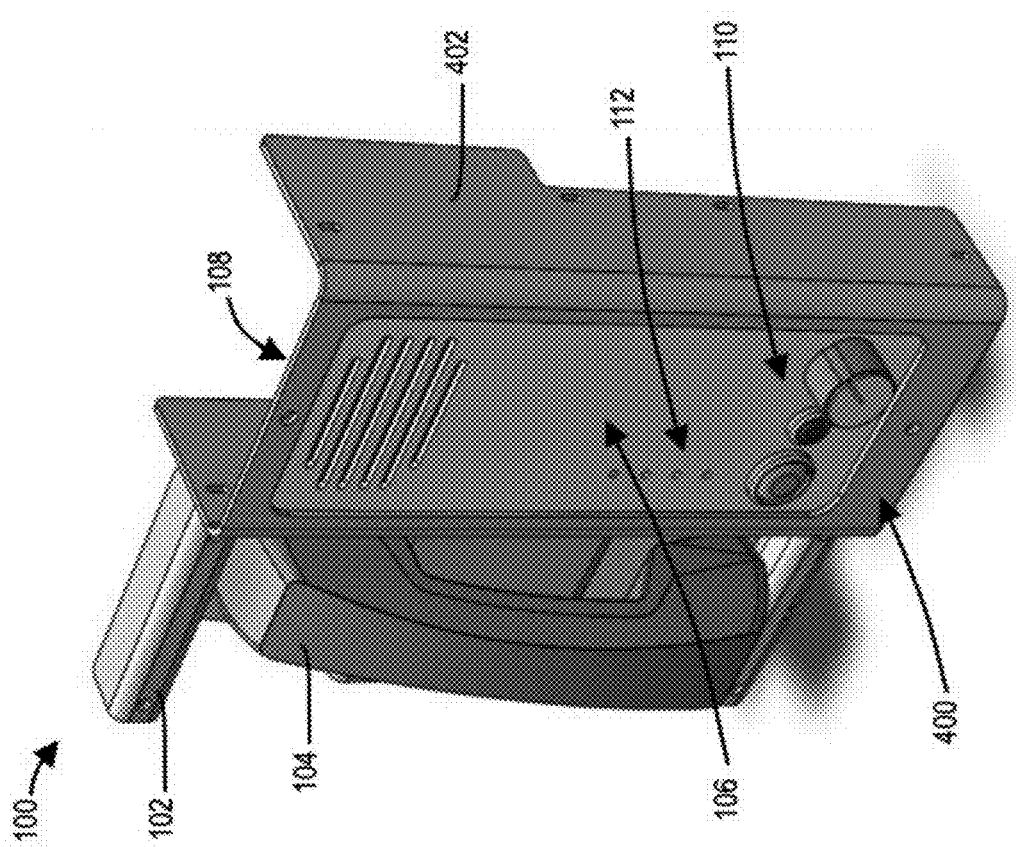
FIG. 3 is a perspective view of the system of FIG. 1, without a case and in a first state, in accordance with at least some embodiments.

As stated above, it would be advantageous to have the ability to integrate a cradle (for a handset) to each side of a housing for the console, and thereby facilitate the positioning of the handset on either side of the console, as may be desired.

FIG. 1 is a front view of a system that addresses the above technical challenge, in a first configuration, in accordance with at least some embodiments.

Referring to FIG. 1, in accordance with at least some embodiments, the system 100 includes a cradle 102, a handset 104 (having a handle 204, a receiver 206, and a transmitter 208) removably disposed on (e.g., supported by) the cradle 102, a console assembly 106, and a housing 108 that supports the console assembly 106.

The cradle 102 defines at least one recess to removably receive a portion of the handset 104. For example, the cradle 102 includes a first recess 103 to receive the transmitter 208 of the handset 104 and/or a second recess 105 to receive the receiver 206 of the handset 104. In some embodiments, the cradle 102 defines only one recess, which can be the same as the first or second recess 103, 105 or it can be a different recess. The cradle 102 may further include an extension 107, which may extend over the handset 104 when seated in the cradle 104, and/or which may be connected to the case 114, via a fastener, catch and/or otherwise.

As stated above, the handset 104 may include a handle 204, a receiver 206, and a transmitter 208. In at least some embodiments, including but not limited to the illustrated embodiment, the handle 204 (or portion(s) thereof), may be narrower than the receiver 206 and/or the transmitter 208.

In addition, the cradle 102 and/or the handset 104 may define a catch to removably or releasably dispose the handset 104 on the cradle 102. In some embodiments, the catch may comprise one or more male or other features on one surface and one or more female or other features on the other surface, wherein the one or more male or other features on the one surface releasably engage the one or more female or other features on the other surface to releasable retain the handset 104 to the cradle 102 via interference, friction, mechanical coupling, and/or otherwise.

Figure 7:
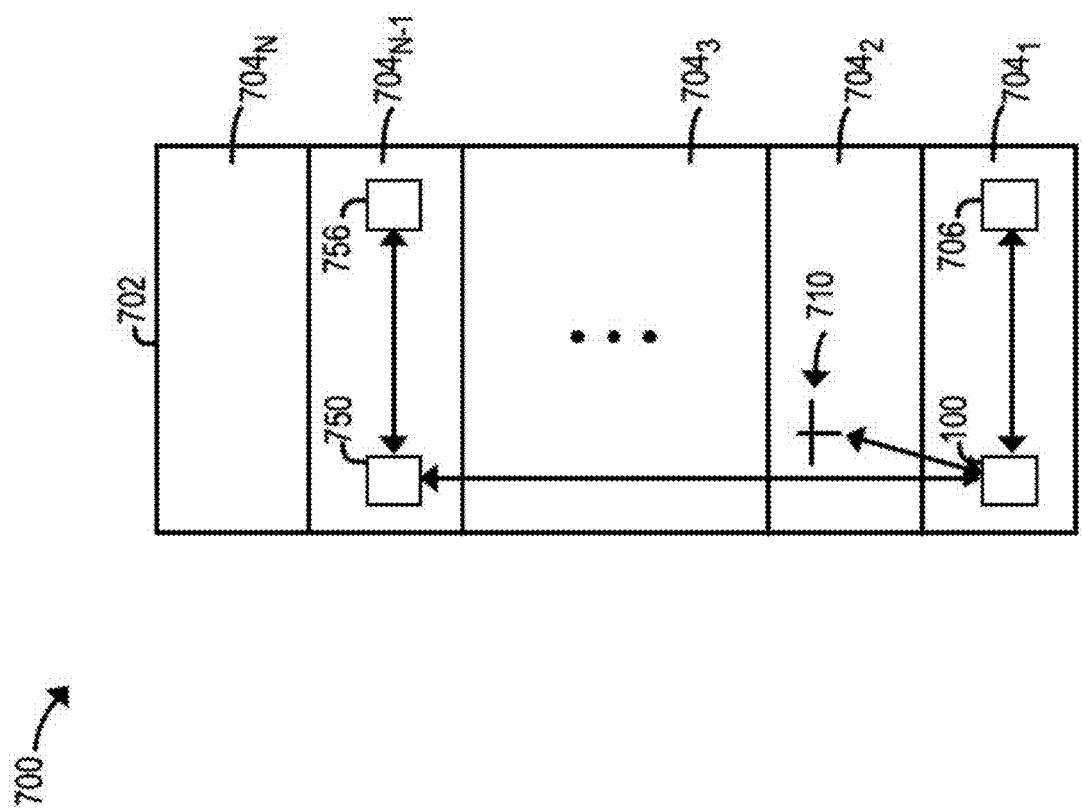
FIG. 7 is a schematic block diagram of a system that includes a building, in accordance with at least some embodiments.

The console assembly 106 may include a front side 109, a control interface 140, one or more visual indicators 112 and/or an audio system (which may include a speaker disposed behind speaker openings 113 on the front side 109 of the console assembly 106). The control interface 140 includes one or more manual controls 110. Although shown as buttons and knobs, the manual controls 110 may additionally or alternatively include a keypad (touch screen or otherwise) and/or any other type(s) of input device(s). The manual controls 110 can be used to select the wireless communication channel (e.g., an emergency communication channel) to receive and/or send wireless communications via handset 104, which can be coupled to wireless antennae in a multi-story building (e.g., as illustrated in FIG. 7). The one or more visual indicators 112 may indicate status and/or other information 112 of the system 100. Although shown as light emitting diodes and/or miniature lamps, the one or more visual indicators 112 may additionally or alternatively include a display and/or any other type(s) of visual indicator(s).

The system 100 may further include a case 114 that supports, and/or within which may be disposed, in whole or in part, the cradle 102, the handset 104, console assembly 106 and/or the housing 108. In at least some embodiments, the case 114 does not completely enclose the system 100.

In at least some embodiments, the system 100 may be mounted on a wall (or other structure) 116 of a building or other structure. For example, the case 114 can include a hole or a projecting feature (e.g., a hook) to hang the system 100 on a wall. Alternatively, the system 100 can mechanically engage a mounting base that itself is mounted on a wall.

In the illustrated embodiment and configuration of the system 100, the cradle 102 is positioned on the left side of the system 100 and/or to the left of the housing 108 (e.g., the cradle 102 is disposed next to the left side 210 of the housing 108). For example, when viewing from the front side 109 of the console assembly 106, the cradle 102 is positioned on the left side of the system 100 and/or to the left of the housing 108. The relative position of the cradle 102 with respect to the system and/or the housing 108 can vary based on the user's point of view. For example, when viewing from the back side of the console assembly 106, the cradle 102 is positioned on the right side of the system 100 and/or to the right of the housing 108.

As stated above, it would be advantageous to have the ability to attach a cradle (for a handset) to each side of a housing for the console, and thereby facilitate the positioning of the handset on either side of the console, as may be desired.

FIG. 2 is a front view of the system 100, in a second configuration, in accordance with at least some embodiments.

Referring to FIG. 2, in accordance with at least some embodiments, in the second configuration of the system 100, the cradle 102 is positioned on the right side of the system 100 and/or to the right of the housing 108. For example, the cradle 102 is disposed next to the right side 212 of the housing 108.

In at least some embodiments, a width of the system with the cradle mounted on the first side of the housing is the same or at least substantially the same as a width of the system with the cradle mounted on the second side of the housing.

As used herein, a dimension that is "substantially the same" as a second dimension has a magnitude that is within +/−5% that of the second dimension.

In at least some embodiments, the system 100, the cradle 102 and/or the housing 108 may have a rectangular outline in a front elevation view, e.g., as shown.

In at least some embodiments, the cradle 102 may have a longitudinal axis 118 and may have a configuration that is symmetrical about such longitudinal axis 118. The housing 108 may have a longitudinal axis 120 and may have a configuration that is symmetrical about such longitudinal axis 120. The case 114 may have a longitudinal axis 122 and may have a configuration that is symmetrical about such longitudinal axis 122. The cradle 102 and/or the case 114 can also having a latitudinal axis 130 and either or both can have a configuration that is symmetrical about such latitudinal axis 130.

FIG. 3 is a perspective view of the system 100, without the case 114 and in a first state, in accordance with at least some embodiments.

Figure 4:
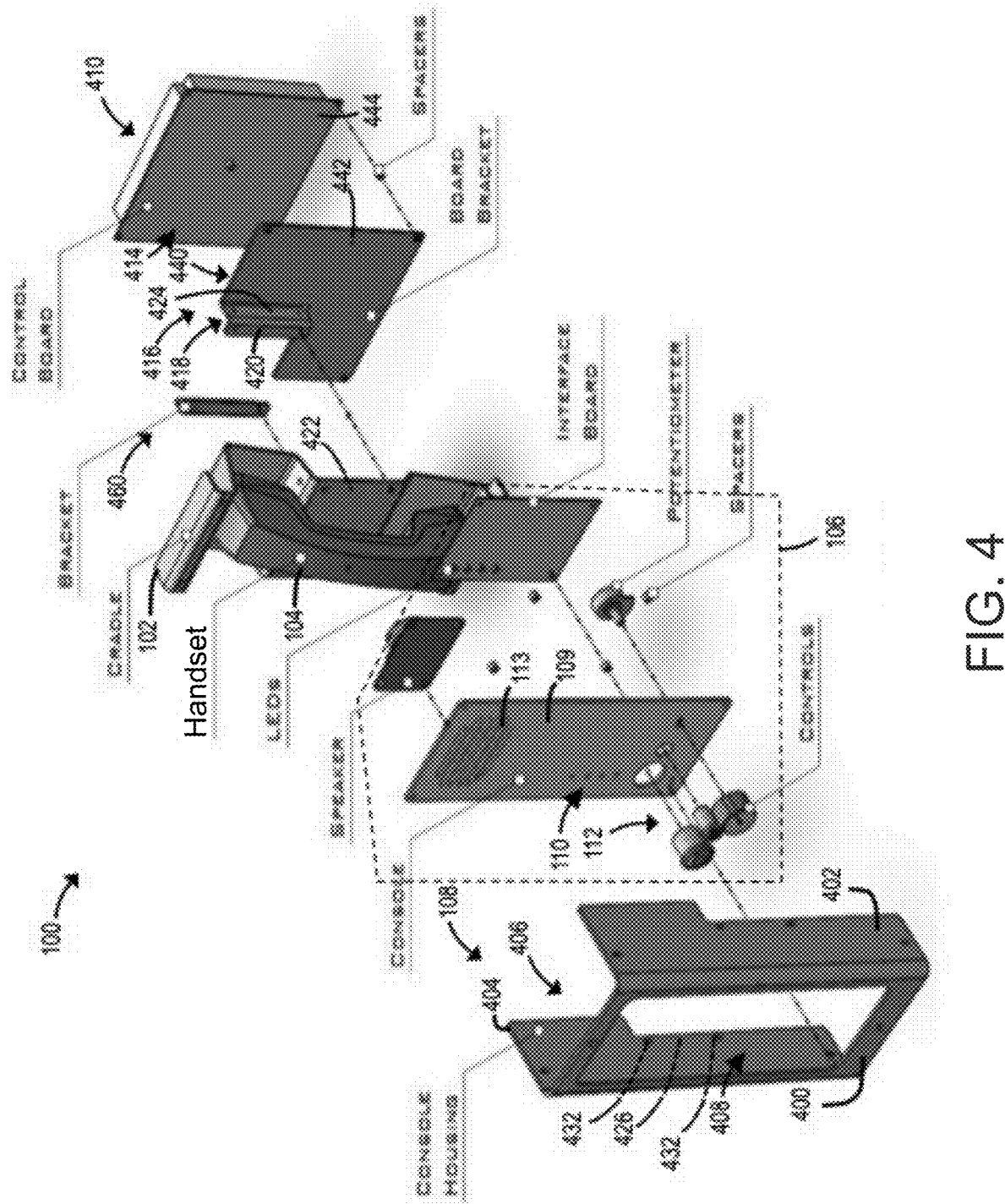
FIG. 4 is an exploded perspective view of a portion of the system of FIG. 1, without a case and in a first state, in accordance with at least some embodiments.

FIG. 4 is an exploded perspective view of a portion of the system 100, without the case 114 and in a first configuration, in accordance with at least some embodiments.

Figure 5:
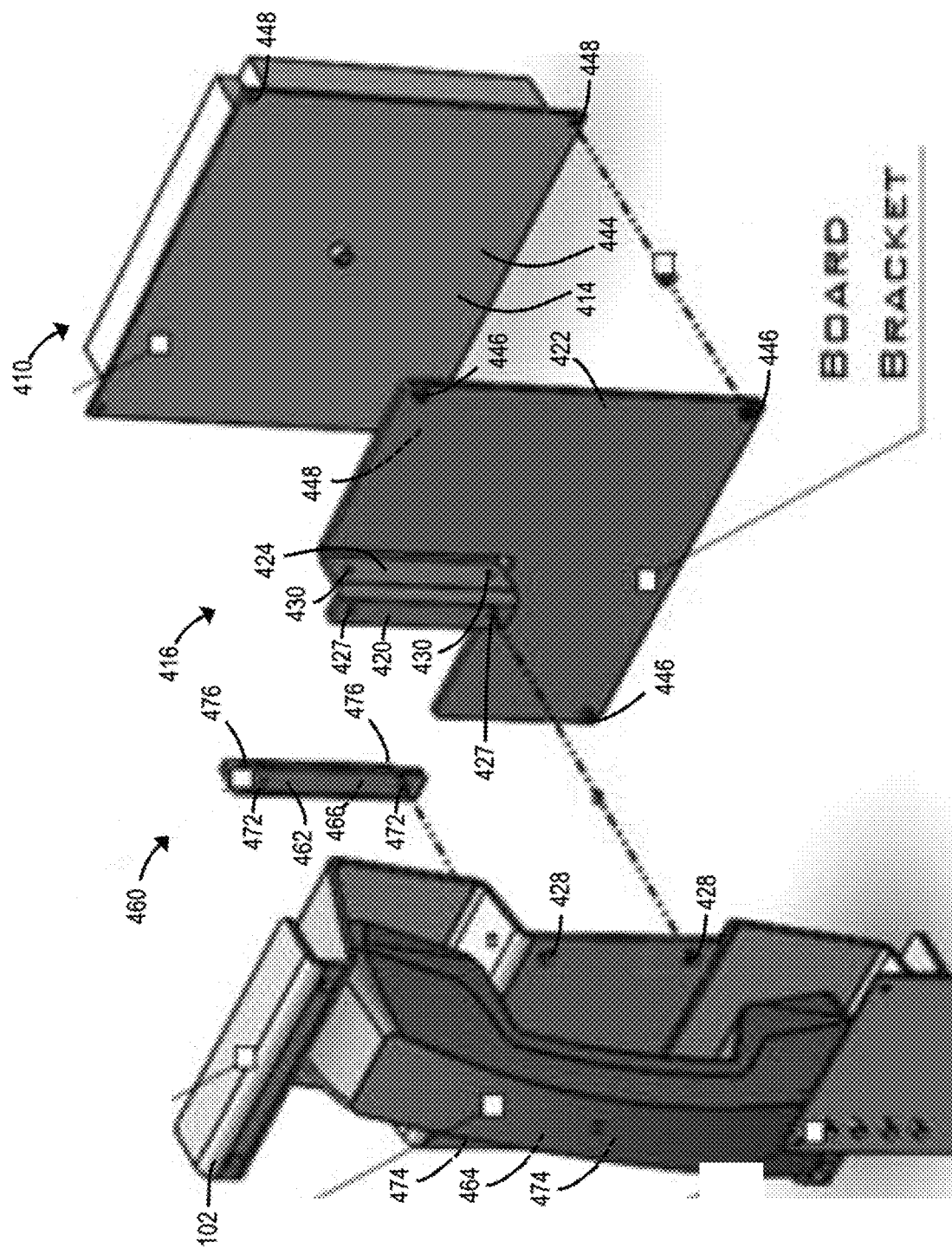
FIG. 5 is an enlarged exploded view of a portion of the system of FIG. 1, in accordance with at least some embodiments.

FIG. 5 is an enlarged exploded view of a portion of the system 100, without the case 114 and in a first state, in accordance with at least some embodiments;

Referring to FIGS. 3-5, in accordance with at least some embodiments, the housing 108 may have a front side 400, and two sides 402, 404, which may be arranged in a U-shape (e.g., in cross section) and/or which may define a channel 406. The sides 402, 404 extend from the front side 400 to a back or a back side of the housing 108

Unless stated otherwise, a "U-shape" is not limited to the U-shape shown in the figures. For example, a U-shape may have any suitable types of edges, e.g., rounded, e.g., as shown, beveled, squared and/or otherwise. The front and/or sides may be planar, e.g., as shown, but are not limited to such. For example, the front may have a radius or curve from side to side. The sides may be perpendicular (90 degrees relative) to the front, e.g., as shown, but are not limited to such. Additionally, the term "U-shaped" does not preclude the addition of a top, bottom and/or rear portions to the housing.

The front 400 of the housing 108 may define an opening 408 to receive the front side 109 of the console assembly 106. The opening 408 may be rectangular, e.g., as shown, and/or may encompass a major portion (e.g., at least 50%) of the front 400 of the housing 108. However, the front 400 of the housing 108 and the opening 408, if present, are not limited to the above.

The console assembly 106 may further include a potentiometer 230 (which may be mechanically and/or electrically connected to one or more of the one or more manual controls 110) and/or an interface board 240 (having electrical components mounted thereon), which may be electrically connected to the one or more manual controls 110 and/or the one or more visual indicators 112 to enable the console assembly to provide its functionality, as may be desired.

In at least some embodiments, including but not limited to the illustrated embodiment, the cradle 102, the housing 108 and/or the front 109 of the console assembly 106 may have an open construction and may comprise walls having uniform (and/or substantially uniform) thickness and bends that define, at least in part, the shape of the cradle 102, housing 104 and/or front side 109 of the console assembly 106.

The system 100 may further include a rear assembly 410 or other rear component(s), which may comprise a circuit board assembly (which may include a printed circuit board 414 and electrical components attached thereto), which may perform one or more functions of the system 100. In at least some embodiments, the rear assembly 410 may comprise a control assembly, which may perform one or more control functions of the system 100.

As stated above, in accordance with at least some aspects, the cradle 102 is releasably attachable to a first one (e.g., right side 402) of the two sides 402, 404 (e.g., right side 402, left side 404) of the housing 108 to position the cradle 102 on a first side of the system 100 (adjacent to or otherwise to the side of a first one of the two sides 402, 402 of the housing 108), and releasably attachable to a second one (e.g., left side 404) of the two sides 402, 404 of the housing 108 to position the cradle 102 on a second side of the system 100 (adjacent to or otherwise to the side of a second one of the two sides 402, 404 of the housing 108).

In that regard, in at least some embodiments, including but not limited to the illustrated embodiment, the system 100 may include a bracket 416 that is connected between the cradle 102 and one of the two sides 402, 404 of the housing 108, as may be desired, to thereby attach the cradle 102 thereto (i.e., to the one of the two sides 402, 404 of the housing 108).

In the illustrated embodiment, the bracket 416 is connected between the cradle 102 and the left side 404 of the housing 108, to thereby attach the cradle 102 thereto (i.e., to the left side 404 of the housing 108) and position the cradle 102 on the left side of the system (adjacent to or otherwise to the side of the left side 404 of the two sides 402, 404 of the housing 108).

In at least some embodiments, including but not limited to the illustrated embodiment, the bracket 416 may comprise an L-shaped (or other type) bracket 418 having a front body 420 and a side body 424 that are orthogonal to each other. The front body (or front surface) 420 is releasably attachable to a back side (e.g., rear facing (or other) surface) 422 of the cradle 102. The side body 424 (or side surface) is releasably attachable to an outer facing (or other) surface 426 of the one of the two sides 402, 404 of the housing 108. The front body 420 and the side body 424 can form first and second legs of the L-shaped bracket 418.

In at least some embodiments, including but not limited to the illustrated embodiment, the bracket 418 may define openings 427 (FIG. 5) and the cradle 102 may define openings 428 (FIG. 5), in register therewith or otherwise corresponding thereto, to receive bolts or fasteners that connect (releasably or otherwise) and/or maintain (releasably or otherwise) the connection between the front body 420 of the bracket 418 and the back side 422 of the cradle 102.

Additionally, the bracket 418 may define openings 430 and the housing 108 may define openings 432 (FIG. 4), in register therewith or otherwise corresponding thereto, that receive bolts or fasteners to connect (releasably or otherwise) and/or maintain (releasably or otherwise) the connection between the side body 424 of the bracket 418 and the outer facing surface 426 of the one of the two sides 402, 404 of the housing 108.

Alternatively, in place of one or more such opening(s) and fastener(s) that connect or otherwise maintain a connection between two surfaces, some embodiments may employ a catch to connect (releasably or otherwise) and/or maintain (releasably or otherwise) the connection between the two surfaces. In some embodiments, the catch may comprise one or more male or other features on one surface and one or more female or other features on the other surface, wherein the one or more male or other features on the one surface releasably engage the one or more female or other features on the other surface to connect (releasably or otherwise) and/or maintain (releasably or otherwise) the connection via interference, friction and/or otherwise.

It may also be desired to connect the cradle 102 to the rear assembly 410. In that regard, in at least some embodiments, the bracket 416 may also be connected between the cradle 102 and the rear assembly 410, to thereby connect the cradle 102 to the rear assembly 310. The bracket 416 can include additional openings (e.g., openings 430) to receive bolts or fasteners to form these connections.

In at least some embodiments, including but not limited to the illustrated embodiment, the bracket 416 may have the form of or otherwise comprise (or be coupled to) a board (or other type of) bracket that includes the bracket 418 discussed above and further includes a board (or other shape)

portion 440 attached to the bracket 418 and having a rear facing (or other) surface 442 connected to a front facing (or other) surface 444 of the rear assembly 410.

In at least some embodiments, including but not limited to the illustrated embodiment, the board portion 440 may define openings 446 (FIG. 5) and the rear assembly 410 may define openings 448 (FIG. 5), in register therewith or otherwise corresponding thereto, that receive bolts or fasteners (which may also pass through spacers) to connect (releasably or otherwise) and/or maintain (releasably or otherwise) the connection between the surface 442 of the board (or other shape) portion 440 and the surface 444 of the rear assembly 410.

In at least some embodiments, including but not limited to the illustrated embodiment, the rear facing (or other) surface 442 of the board portion 440 may have a height and a width that is substantially the same as a height and a width, respectively, of the front facing (or other) surface 444 of the rear assembly 410.

As discussed above, in place of one or more such opening(s) and fastener(s) that connect or otherwise maintain a connection between two surfaces, some embodiments may employ a catch to connect (releasably or otherwise) and/or maintain (releasably or otherwise) the connection between the two surfaces. In some embodiments, the catch may comprise one or more male or other features on one surface and one or more female or other features on the other surface, wherein the one or more male or other features on the one surface releasably engage the one or more female or other features on the other surface to connect (releasably or otherwise) and/or maintain (releasably or otherwise) the connection via interference, friction and/or otherwise.

If a connection between the cradle 102 and the rear assembly 410 is desired but the bracket 416 is not to be used for such, a separate bracket may be connected between the cradle 102 and the rear assembly 410.

It may also be desired to connect the cradle 102 to the case 114 (FIGS. 1-2). In that regard, in at least some embodiments, the system 100 may include a bracket 460 that is connected between the cradle 102 and one side of the case 114 to thereby attach the cradle 102 thereto (i.e., to the one side of the case 114).

In at least some embodiments, including but not limited to the illustrated embodiment, the bracket 460 may comprise an L-shaped (or other type) bracket having a front facing (or other) surface 462 of a first leg (or other portion) connected to a rear facing (or other) surface 464 of the cradle 102, and having a side facing (or other) surface 466 of a second leg (or other portion) connected to an inner facing (or other) surface (not shown) of the one side of the case 114.

In at least some embodiments, including but not limited to the illustrated embodiment, the bracket 460 may define openings 472 and the cradle 102 may define openings 474, in register therewith or otherwise corresponding thereto, that receive bolts or fasteners to connect (releasably or otherwise) and/or maintain (releasably or otherwise) the connection between the surface 462 of the bracket 460 and the surface 464 of the cradle 102.

Additionally, the bracket 460 may define openings 476 and the case 114 may define openings (not shown), in register therewith or otherwise corresponding thereto, that receive bolts or fasteners to connect (releasably or otherwise) and/or maintain (releasably or otherwise) the connection between the surface 466 of the bracket 460 and the surface (not shown) of the one of the sides of the case 114.

Alternatively, in place of one or more such opening(s) and fastener(s) that connect or otherwise maintain a connection between two surfaces, some embodiments may employ a catch to connect (releasably or otherwise) and/or maintain (releasably or otherwise) the connection between the two surfaces. In some embodiments, the catch may comprise one or more male or other features on one surface and one or more female or other features on the other surface, wherein the one or more male or other features on the one surface releasably engage the one or more female or other features on the other surface to connect (releasably or otherwise) and/or maintain (releasably or otherwise) the connection via interference, friction and/or otherwise.

As stated above, FIGS. 3-5 show the system in a first configuration. In at least some embodiments, if it is desired to attach the cradle 102 to a first one 402 of the two sides 402, 404 of the housing 108 to position the cradle 102 on a first side of the system (adjacent to or otherwise to the side of a first one 402 of the two sides 402, 404 of the housing 108), instead of (and/or after) attaching the cradle to the second one 404 of the two sides 402, 404 of the housing 108 to position the cradle 102 on the second side of the system 100, a second bracket 516 (e.g., a second L-shaped bracket 518) that is a mirror image of the first bracket 416 (e.g., of the first L-shaped bracket 418) may be employed, and the attachments and connections described above may be modified accordingly for the second configuration, compared to those discussed above for the first configuration, in order to thereby position the cradle 102 on the first side of the system (adjacent to or otherwise to the side of the first one 402 of the two sides 402, 404 of the housing 108).

For example, in the first configuration the front body 420 of the first L-shaped bracket 418 is releasably attached to the back side 422 of the cradle 102 and the side body 424 of the first L-shaped bracket 418 is releasably attached to the first side 402 (e.g., right side) of the housing 108. In the second configuration, the front body 520 of the second L-shaped bracket 518 is releasably attached to the back side 422 of the cradle 102 and the side body 524 of the second L-shaped bracket 518 is releasably attached to the second side 404 (e.g., left side) of the housing 108. The second bracket 516 and/or the second L-shaped bracket 518 can include a second board-shaped bracket 540.

Thus, in at least some embodiments, the system 100 has at least two configurations and is dynamically re-configurable between the first configuration and the second configuration without causing damage to or otherwise irreversibly modifying the structure of the cradle 102, the handset 104, the console 106, the housing 108, and/or the case 114.

In at least some aspects, some or all of the above components of the system may be included in a kit for constructing the system, in a dynamically configurable state or otherwise.

In at least some embodiments, the modified connections may be assisted if the cradle 102, the housing 108 and the case 114 are symmetrical (or at least substantially symmetrical). As used herein, "substantially symmetrical" means symmetrical to within +/−5%. In some other embodiments, the cradle 102 and/or housing 108 are not entirely symmetrical and/or not entirely substantially symmetrical, but the location and configuration of features that relate to the attachments and connections may be symmetrical and/or substantially symmetrical. Some embodiments may not include any of the above.

As can be seen, the system 100 includes a plurality of interconnected modules. Each module can be generally rectangular or another shape, and the size of each module can be the same or different than one or more of the other modules. For example, a console assembly module 506

(e.g., including console assembly 106) is configured and arranged to be disposed in a housing module 508 (e.g., including housing 108). In addition, a speaker module 515 and/or an interface board module 525 is configured and arranged to be disposed in a portion of the console assembly module 506. A first bracket module 516 (e.g., including bracket 416 and/or L-shaped bracket 418) and a second bracket module 536 (e.g., including second bracket 516 and/or second L-shaped bracket 518) are configured and arranged to be removably attached to a cradle module 502 (e.g., including cradle 102) and to the housing module 508. The cradle module 502 is disposed next to a first side of the housing module 508 using the first bracket module 516, and the cradle module 502 is disposed next to a second side of the housing module 508 using the second bracket module 536. The cradle module 502 is configured and arrange to removably receive the handset 104. In addition, a control board module is configured and arranged to be removably attached to the first or second bracket modules 516, 536.

Figure 6:
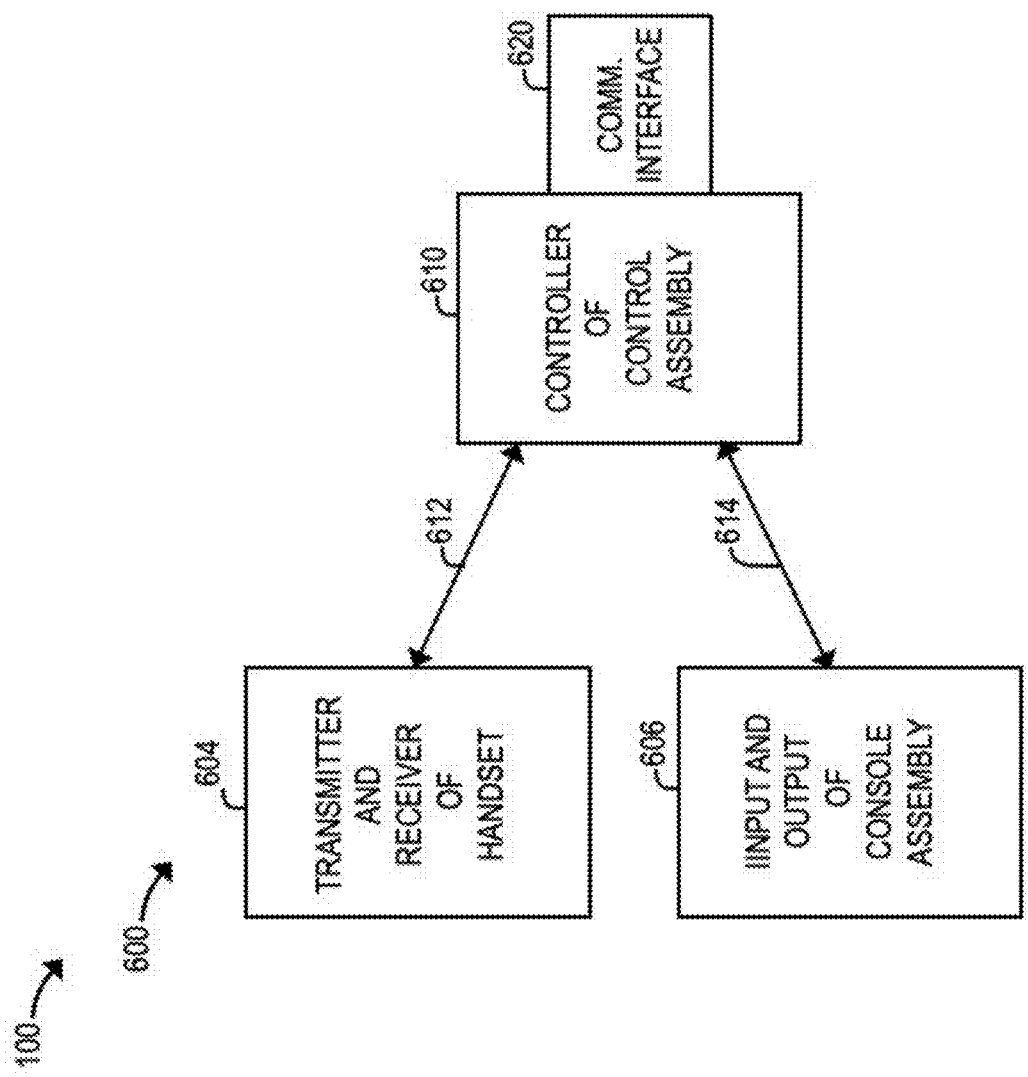
FIG. 6 is a schematic block diagram of a processing system of the system, in accordance with at least some embodiments.

FIG. 6 is a schematic block diagram of a processing system 600 of the system 100, in accordance with at least some embodiments.

Referring to FIG. 6, in accordance with at least some embodiments, the processing system 600 may include a transmitter and receiver 604 of the handset 104, input and output 606 of the console assembly 106, a controller 610 of the controller assembly 410, a plurality of internal communication links, e.g., communication links 612, 614, and a communications interface 620.

In at least some embodiments, the console will allow for easy operation of all functions, with controls and switches/buttons being conveniently located and labeled. In at least some embodiments, this equipment meets all requirements established by New York, N.Y., (and/or other jurisdiction(s)) without adding undue complexity.

The communications interface 620 can include a wireless and/or a wired communication interface. The wireless and/or wired communication interface can be used to communicate with a mobile computing device (e.g., as discussed below).

In at least some embodiments, the processing system 600 may be (or comprise) an auxiliary radio communication (ARC) system that meets or exceeds the requirement for ARCs codified in the New York City Building Code (e.g., sections 403.4.4 and 907.2.13.2).

FIG. 7 is a schematic block diagram of a system 700 that includes one or more of the systems 100 described herein, in accordance with at least some embodiments.

Referring to FIG. 7, the system 700 includes a multi-story building 702, having a plurality of floors, e.g., floors $704_1$-$704_N$.

The system 100 may be mounted to a wall or other structure on a first or other floor of the building 702, e.g., floor $704_1$.

In at least some embodiments, the system 100 can include a communications interface for sending information to and/or receiving information from a mobile computing device 706 of a user. In at least some embodiments, the system 100 may send information to and/or receive information from a system, e.g., system 750, which in at least some embodiments, may be the same as and/or similar to the system 100, mounted to a wall or other structure on another, e.g., higher floor, of the building 702, e.g., floor $704_{N-1}$. In at least some embodiments, the system 750 may also send information to and/or receive information from a mobile computing device 756 of a user, which in at least some embodiments, may be the same as and/or similar to, the mobile computing device 706. In addition or in the alternative, the system 100 can (e.g., via communications interface 620 on system 100) send information to and/or receive information from at least one antenna 710 located on one or more floors such as floor $704_2$. The antenna(e) 710 can relay the information wirelessly to emergency personnel who can receive the related information on a mobile radio or other device over the selected communication channel.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in field programmable gate arrays (FPGAs) or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

Additionally, it should be appreciated that according to one aspect, one or more computer programs that when executed perform methods of the present application need not reside on a single computer or processor, but may be distributed in a modular fashion among a number of different computers or processors to implement various aspects of the present application.

Figure 8:
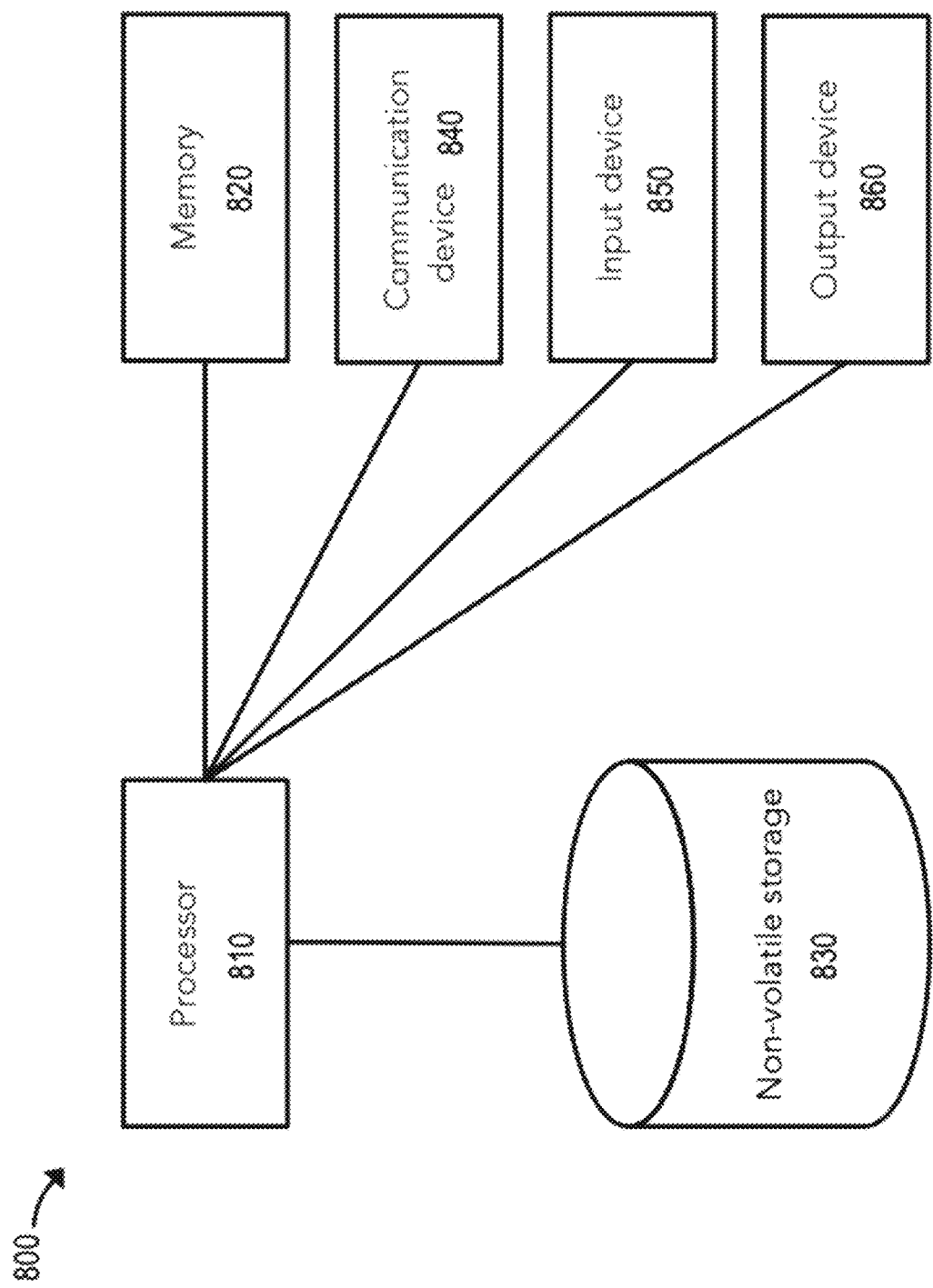
FIG. 8 is a block diagram of an architecture, in accordance with at least some embodiments.

FIG. 8 is a block diagram of a computer architecture 800 according to some embodiments. In some embodiments, one or more of the systems (or portion(s) thereof), apparatus (or portion(s) thereof) and/or devices (or portion(s) thereof) disclosed herein may have an architecture that is the same as and/or similar to one or more portions of the architecture 800.

In some embodiments, one or more of the methods (or portion(s) thereof) disclosed herein may be performed by a system, apparatus and/or device having an architecture that is the same as or similar to the architecture 800 (or portion(s) thereof). The architecture may be implemented as a distributed architecture or a non-distributed architecture.

Referring to FIG. 8, in accordance with at least some embodiments, the architecture 800 may include one or more processors 810 (e.g., hardware-based processors) and one or more articles of manufacture that comprise non-transitory computer-readable storage media (e.g., memory 820 and one or more non-volatile storage media 830). The processor 810 may control writing data to and reading data from the memory 820 and the non-volatile storage device 830 in any suitable manner, as the aspects of the disclosure provided herein are not limited in this respect. The storage media may store one or more programs and/or other information for operation of the architecture 800. In at least some embodiments, the one or more programs include one or more instructions to be executed by the processor 810 to provide one or more portions of one or more tasks and/or one or more portions of one or more methods disclosed herein. In some embodiments, other information includes data for one or more portions of one or more tasks and/or one or more portions of one or more methods disclosed herein. To perform any of the functionality described herein, the processor 810 may execute one or more processor-executable instructions stored in one or more non-transitory computer-readable storage media (e.g., the memory 820), which may serve as non-transitory computer-readable storage media storing processor-executable instructions for execution by the processor 810.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embodied in a device not generally regarded as a computer but with suitable processing capabilities, including a Personal Digital Assistant (PDA), a smart phone or any other suitable portable or fixed electronic device.

In at least some embodiments, the architecture 800 may have one or more communication devices 840, which may be used to interconnect the architecture to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, in at least some embodiments, the architecture 800 may have one or more input devices 850 and/or one or more output devices 860. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, the architecture 800 may receive input information through speech recognition or in other audible formats.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

It should be understood that the features disclosed herein can be used in any combination or configuration. Thus, in at least some embodiments, any one or more of the embodiments (or feature(s) thereof) disclosed herein may be used in association with any other embodiment(s) (or feature(s) thereof) disclosed herein. Similarly, in at least some embodiments, any one or more of the features disclosed herein may be used without any one or more other feature disclosed herein.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:
1. A configurable apparatus comprising:
a housing having opposing first and second housing sides;
a cradle; and
a handset removably disposed on the cradle,
wherein:

the apparatus has a first configuration where a first bracket is releasably attached to the cradle and to the housing such that the cradle is disposed next to the first housing side, the apparatus has a second configuration where a second bracket is releasably attached to the cradle and to the housing such that the cradle is disposed next to the second housing side, the first and second brackets include first and second L-shaped brackets, respectively, each L-shaped bracket includes orthogonal front and side bodies, when the apparatus is in the first configuration the front body of the first L-shaped bracket is releasably attached to a back side of the cradle and the side body of the first L-shaped bracket is releasably attached to the first housing side, and when the apparatus is configured in the second configuration the front body of the second L-shaped bracket is releasably attached to the back side of the cradle and the side body of the second L-shaped bracket is releasably attached to the second housing side.

2. The apparatus of claim 1, wherein the first and second brackets are mirror images of each other.

3. The apparatus of claim 1, wherein each of the first and second brackets includes a board bracket.

4. The apparatus of claim 1, wherein the housing includes a front housing body and the first and second housing sides extend from the front housing body towards a back of the apparatus.

5. The apparatus of claim 1, further comprising a console assembly disposed in an opening defined in the front housing body.

6. The apparatus of claim 5, wherein the console assembly includes a control interface that selects a communication channel for the handset.

7. The apparatus of claim 6, wherein the console assembly includes a visual indicator of a status of the apparatus.

8. The apparatus of claim 5, wherein the console assembly further comprises a communications interface for bidirectional communication with a mobile computing device.

9. The apparatus of claim 1, wherein the cradle includes at least one recess to removably receive a portion of the handset.

10. The apparatus of claim 1, wherein:

when the apparatus is in the first configuration the first bracket is releasably attachable to a control assembly, the first bracket disposed between the control assembly and the cradle, and when the apparatus is in the second configuration the second bracket is releasably attachable to the control assembly, the second bracket disposed between the control assembly and the cradle.

11. The apparatus of claim 10, wherein the control assembly includes a circuit board.

12. The apparatus of claim 1, wherein the housing and the cradle are disposed in a case, the case mountable on a wall.

13. A kit comprising:
a housing having first and second housing sides;
a handset;
a cradle having opposing front and back sides and a recess to removably receive the handset;
a first bracket releasably attachable, in a first configuration, to the back side of the cradle and to the first housing side to dispose the cradle next to the first housing side; and a second bracket releasably attachable, in a second configuration, to the back side of the cradle and to the second housing side to dispose the cradle next to the second housing side, wherein:
in the first configuration the front body of the first L-shaped bracket is releasably attachable to the back side of the cradle and the side body of the first L-shaped bracket is releasably attachable to the second housing side, and in the second configuration the front body of the second L-shaped bracket is releasably attachable to the back side of the cradle and the side body of the second L-shaped bracket is releasably attachable to the first housing side.

14. The kit of claim 13, wherein the first and second brackets are mirror images of each other.

15. The kit of claim 13, wherein the first and second brackets include first and second L-shaped brackets, respectively.

16. The kit of claim 15, wherein each L-shaped bracket includes orthogonal front and side bodies.

17. A configurable apparatus comprising:
a housing having opposing first and second housing sides;
a cradle; and
a handset removably disposed on the cradle,
wherein:
the apparatus has a first configuration where a first bracket is releasably attached to the cradle and to the housing such that the cradle is disposed next to the first housing side, the apparatus has a second configuration where a second bracket is releasably attached to the cradle and to the housing such that the cradle is disposed next to the second housing side, when the apparatus is in the first configuration the first bracket is releasably attachable to a control assembly, the first bracket disposed between the control assembly and the cradle, and when the apparatus is in the second configuration the second bracket is releasably attachable to the control assembly, the second bracket disposed between the control assembly and the cradle.

18. The apparatus of claim 17, wherein the first and second brackets are mirror images of each other.

19. The apparatus of claim 17, wherein the first and second brackets include first and second L-shaped brackets, respectively.

20. The apparatus of claim 19, wherein each L-shaped bracket includes orthogonal front and side bodies.

21. The apparatus of claim 20, wherein:

when the apparatus is in the first configuration the front body of the first L-shaped bracket is releasably attached to a back side of the cradle and the side body of the first L-shaped bracket is releasably attached to the first housing side, and when the apparatus is configured in the second configuration the front body of the second L-shaped bracket is releasably attached to the back side of the cradle and the side body of the second L-shaped bracket is releasably attached to the second housing side.

22. The apparatus of claim 20, wherein each of the first and second brackets includes a board bracket.

23. The apparatus of claim 17, wherein the housing includes a front housing body and the first and second housing sides extend from the front housing body towards a back of the apparatus.

24. The apparatus of claim 17, further comprising a console assembly disposed in an opening defined in the front housing body.

25. The apparatus of claim 24, wherein the console assembly includes a control interface that selects a communication channel for the handset.

26. The apparatus of claim 25, wherein the console assembly includes a visual indicator of a status of the apparatus.

27. The apparatus of claim 24, wherein the console assembly further comprises a communications interface for bidirectional communication with a mobile computing device.

28. The apparatus of claim 17, wherein the cradle includes at least one recess to removably receive a portion of the handset.

29. The apparatus of claim 17, wherein the control assembly includes a circuit board.

30. The apparatus of claim 17, wherein the housing and the cradle are disposed in a case, the case mountable on a wall.

* * * * *